(12) United States Patent
Ristau et al.

(10) Patent No.: US 8,499,405 B1
(45) Date of Patent: Aug. 6, 2013

(54) APPARATUS FOR CLEANING A WASTE WATER TREATMENT TANK

(75) Inventors: Jerold W. Ristau, Lexington, KY (US); Ford W. Hall, Lexington, KY (US)

(73) Assignee: Ford W. Hall Company, Richmond, KY (US)

( * ) Notice: Subject to any disclaimer, the term of this patent is extended or adjusted under 35 U.S.C. 154(b) by 2284 days.

(21) Appl. No.: 11/132,694

(22) Filed: May 19, 2005

Related U.S. Application Data

(60) Provisional application No. 60/572,323, filed on May 19, 2004.

(51) Int. Cl.
*F22B 37/48* (2006.01)

(52) U.S. Cl.
USPC ............................................ 15/246.5; 15/246

(58) Field of Classification Search
USPC ................. 15/246.5, 53.2, DIG. 2, 179, 201, 15/246; 210/241, 528
See application file for complete search history.

(56) References Cited

U.S. PATENT DOCUMENTS

| | | | | | |
|---|---|---|---|---|---|
| 3,626,537 | A | * | 12/1971 | Wilson | 15/53.3 |
| 4,039,014 | A | * | 8/1977 | Sellars | 15/53.3 |
| 4,830,748 | A | * | 5/1989 | Hall | 210/241 |
| 5,626,095 | A | * | 5/1997 | Runion | 119/57.2 |
| 5,720,890 | A | * | 2/1998 | Caliva | 210/800 |
| 6,701,569 | B1 | * | 3/2004 | Benner | 15/250.31 |

\* cited by examiner

*Primary Examiner* — Robert Scruggs
(74) *Attorney, Agent, or Firm* — King & Schickli, PLLC

(57) ABSTRACT

An apparatus is provided for cleaning algae and other debris from a water treatment tank including a mechanically driven component. The apparatus includes a breakaway scrubber assembly and a mounting bracket securing the breakaway scrubber assembly to the mechanically driven component.

13 Claims, 3 Drawing Sheets

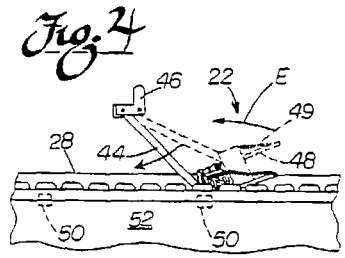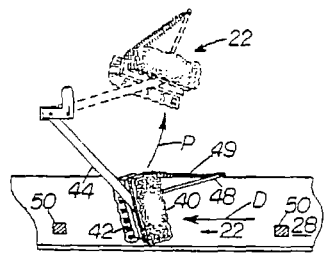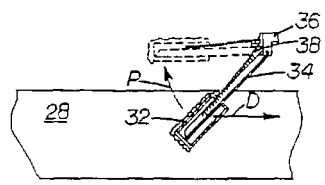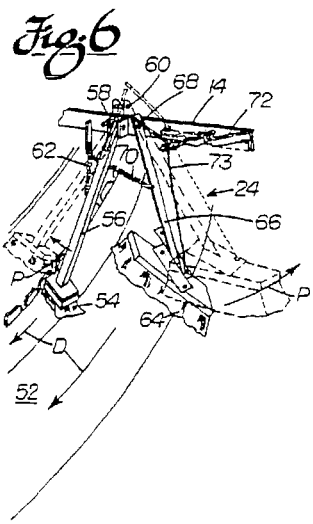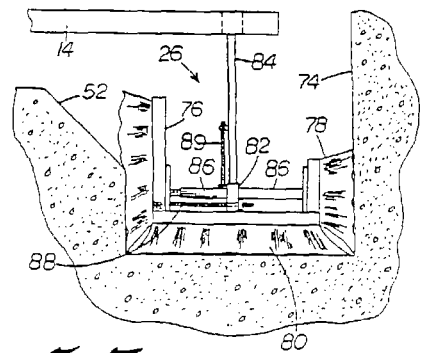

APPARATUS FOR CLEANING A WASTE WATER TREATMENT TANK

This application claims the benefit of U.S. Provisional Patent Application Ser. No. 60/572,323 filed on 19 May 2004.

TECHNICAL FIELD

The present invention relates generally to the cleaning of sewage treatment facilities and, more particularly, to an apparatus for cleaning algae and other debris from a water treatment tank including a mechanically driven skimmer blade and/or rake assembly and/or rotating bridge.

BACKGROUND OF THE INVENTION

The necessity for providing sewage treatment plants to clean and purify water discharged from homes and factories is well known. The function of a sewage treatment facility is to receive raw sewage (water containing waste material) as discharged from a city sewerage system and clean it to ultimately produce purified water. This is accomplished through a series of biological and mechanical processes.

In a typical water treatment facility, the raw sewage is received from the sewerage system and passed through a coarse screen to remove large pieces of matter. The sewage is next directed to one or more primary sedimentation tanks or clarifiers. The sewage remains in primary sedimentation for a period of time sufficient to allow the majority of the heavy matter to settle to the bottom of the tank forming sludge. The sludge is removed for "digestion" by microorganisms. The digested sludge is dried and can be used as compost or fertilizer. The remaining liquid from this treatment is then aerated to remove ammonia and passed into final sedimentation water treatment tanks to remove any remaining solid material.

Water treatment tank configurations vary with each treatment facility application. This notwithstanding, most final sedimentation water treatment tanks are round. This simplifies automatic skimming, churning and/or bottom scraping operations. More specifically, by eliminating inaccessible corners and providing uniform surfaces a revolving arm or skimmer blade can provide complete and efficient collection and prevent sludge buildup.

During operation of one type of water treatment tank sediment containing water enters the center of the tank. In a continuous process, the lighter clean water is effectively decanted from the heavier sediment containing water. More particularly, the clean water is displaced from the tank by the constant flow of sediment containing water into the tank. The displaced clean water is forced to flow under a scum baffle plate for collecting floating scum and then over a weir, ultimately entering an effluent channel or launder. The launder directs the water to the next treatment stage where it is disinfected and further made safe to be discharged into a river or stream.

As is known in the art, the outdoor exposure of the water treatment tanks in direct sunlight encourages the growth of algae. This growth is most prevalent on the baffle, weir, spillway and launder. Disadvantageously, algae growth on these members inhibits the flow of clean water from the tank. Further, the algae can be carried in thick masses and high concentrations in the clean water being discharged from the final treatment tank. When this occurs, the plant experiences a spike in the total suspended solids reading which could create an EPA violation. Unfortunately, manually cleaning the components of the tank is a very labor intensive process.

U.S. Pat. No. 4,830,748 to Hall discloses an apparatus particularly useful for cleaning algae and other debris from a water treatment tank of the type described. More specifically, a series of brushes for cleaning the baffle, weir, spillway and launder are attached by means of a framework or bracket to the revolving skimmer blade of the round water treatment tank. As the skimmer blade is driven around the tank, these brushes sweep algae and other debris from the surfaces being cleaned.

While the apparatus disclosed in the Hall U.S. Pat. No. 4,830,748 is remarkably successful in cleaning algae and debris from a water treatment tank and has met with commercial success, further improvement of the apparatus is possible. More specifically, it is not unheard of for employees of a waste water treatment plan to inadvertently leave hoses, ladders or other equipment in the launder or along the spillway, weir or baffle after performing some service or function. In some instances, the brush cleaning system has been known to catch on and become entangled with these items as it passes. Under these circumstances the brush system including its series of support arms, framework and mounting bracket or even the revolving skimmer blade itself may become damaged. The present invention represents an improved apparatus for cleaning algae and other debris from a water treatment tank that substantially reduces or avoids potential damage as a result of this problem.

SUMMARY OF THE INVENTION

In accordance with the purposes of the present invention as described herein, an apparatus is provided for cleaning algae and other debris from a water treatment tank including a mechanically driven component such as a rake assembly, rotating bridge, skimmer blade or the like. The apparatus includes a breakaway scrubber assembly and a mounting bracket securing that breakaway scrubber assembly to the mechanically driven component. Additionally, the main frame of the apparatus may be mounted to the mechanically driven skimmer arm or other such component of the water treatment tank by means of a breakaway system.

More particularly describing the invention, the breakaway scrubber assembly includes a cleaning tool selected from a group consisting of a brush, a sponge, a pad, a squeegee, a wiper or a combination thereof. Additionally, the breakaway scrubber assembly includes a support arm extending between the mounting bracket and the cleaning tool. A first fastener secures the support arm to the mounting bracket. A second fastener secures the support arm to the cleaning tool. In one possible embodiment the first fastener is a shear pin or shear bolt designed to break when subjected to a force exceeding a predetermined value. In another possible embodiment the second fastener is a shear pin or shear bolt designed to break away when subjected to a force exceeding a predetermined value. In yet another embodiment both the first and second fasteners are shear pins or shear bolts of the type described.

In yet another possible embodiment, the support arm includes a first section and a second section. In this embodiment a third fastener secures the first section and second section of the support arm together. That third fastener may be a shear pin or shear bolt designed to break when subjected to a force exceeding a predetermined value. In still another embodiment the support arm is a shear arm having a frangible point designed to break when the arm is subjected to a force exceeding a predetermined value.

It should be appreciated that the breakaway scrubber assembly and/or cleaning tool may be adapted to clean the baffle, the weir, the spillway or the effluent channel/launder.

In accordance with yet another aspect of the present invention, a method is provided of preventing potential damage to a mechanically driven skimmer arm in a water treatment tank. The method comprises the steps of cleaning a surface of the water treatment tank with a scrubber attached to the mechanically driven skimmer arm. Additionally, the method includes the step of securing the scrubber to the skimmer arm by breakaway connection. That connection is designed to break when subjected to a force exceeding a predetermined value A where A is less than a force B sufficient to damage the mechanically driven skimmer arm but greater than the force C needed to drive the cleaning tool around the water treatment tank and perform the desired cleaning operation. Typically, the value A is between about 711 to about 1068 Newtons and more typically between about 800 to about 980 Newtons.

In the following description there is shown and described several preferred embodiments of the present invention, simply by way of illustration of some of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain certain principles of the invention. In the drawing:

FIG. 4 is a schematical view of the first set of brushes for cleaning the outside of the baffle and the inside of the weir, the phantom view and the action arrows depicting operation as the brushes travel over a baffle support bracket;

FIG. 4A shows the brushes of FIG. 4 in the engaged and disengaged positions;

FIG. 5 shows the other brush in the first set of brushes for cleaning the inside surface of the baffle in both the engaged and disengaged positions;

FIG. 6 shows the second set of brushes in the engaged and disengaged positions;

FIG. 7 shows the clean water flow channel in cross section and the third set of cleaning brushes in the engaged position;

Reference will now be made in detail to the present preferred embodiments of the invention, examples of which are illustrated in the accompanying drawing.

DETAILED DESCRIPTION OF THE INVENTION

Figure 1:
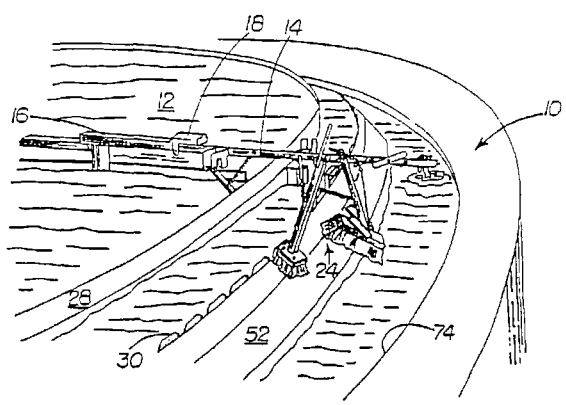
FIG. 1 is a perspective view of the cleaning apparatus of the present invention shown installed on a water treatment tank.
Figure 2:
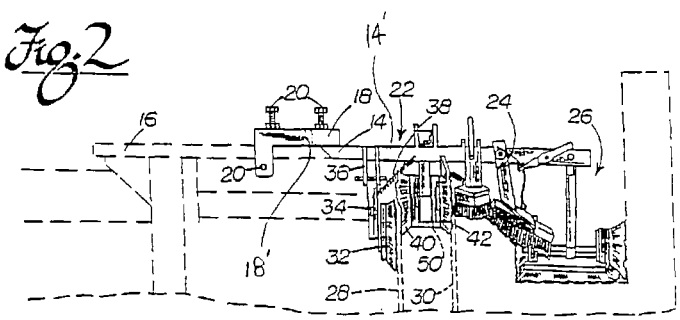
FIG. 2 is a schematical view of the water treatment tank showing the cleaning apparatus of the present invention in an operative cleaning position, the details of the water treatment tank being shown in phantom.

Reference is now made to FIG. 1 showing the apparatus 10 of the present invention installed in a final sedimentation water treatment tank 12. As is shown in FIGS. 1 and 2, the apparatus 10 includes a main frame member 14 which is installed on the end of skimmer blade 16. During operation, the skimmer blade 16 is slowly mechanically driven and revolved around the circular water treatment tank 12 to direct any floating debris to a drain. The apparatus 10 through main frame member 14 is simply driven around the tank by skimmer blade 16. In this manner, the cleaning operation can be accomplished automatically, without any other external energy input.

As is best illustrated in FIG. 2, main frame member 14 includes a mounting bracket 18. To install the apparatus 10, mounting bracket 18 is simply placed over the end of skimmer blade 16 and tightened securely into position through the use of set bolts 20. Advantageously, it should be appreciated that the convenient mounting of the cleaning apparatus 10 through the bracket 18 allows the apparatus to be easily disconnected from the skimmer blade 16 for servicing.

One possible embodiment of the apparatus 10 selected to illustrate the principles of the present invention includes three sets of cleaning brushes 22, 24 and 26 (see FIG. 2). A first set of brushes 22 is provided to clean the baffle 28 and the weir 30. Brush set 22 includes brush 32 for cleaning the inner surface of baffle 28. Brush 32 is pivotally mounted to main frame member 14 through support arm 34 and bracket 36 (see FIG. 5). Spring 38 is provided to apply a positive force between main frame member 14 and support arm 34 thereby biasing brush 32 into tight engagement with the inside surface of baffle 28. Action arrow D shows the direction of brush travel during cleaning.

As is shown in phantom in FIG. 5, brush 32 can be pivoted upwardly and locked into a disengaged or non-operative position (shown by action arrow P). As will be described below, each brush or set of brushes can be locked into a disengaged position much in the same manner as brush 32. Advantageously, this allows cleaning of only the areas required, and also allows the brushes to be cleaned or changed while the apparatus 10 is in operation.

As shown in FIGS. 2 and 4A, the first set of brushes 22 further includes brushes 40 and 42 to clean the outside surface of baffle 28 and the inside surface of weir 30 respectively. As shown, brushes 40, 42 are pivotally mounted to the distal end of a support arm 44. The support arm 44 is pivotally mounted to the frame member 14 in a bracket 46. A base member 48 is also fixed to the support arm 44 adjacent to the distal end. A spring 49 is connected between one end of each brush 40, 42 and the distal or trailing end of the base member 48. The springs 49 serve to bias the brushes 40, 42 into a substantially vertical orientation as best shown in FIG. 4A. As described in detail below, the biasing springs 49, the pivotal mounting of the brushes 40, 42 to the support arm 44 and the pivotal mounting of the support arm in the bracket 46 serve to allow the brushes to "step over" the brackets 50 upon which the baffle 28 is mounted.

More specifically, when between brackets 50, the springs 49 bias the brushes 40, 42 into a vertical orientation and the weight of the brush set 22 holds the brushes down in the water (see FIG. 4A). This serves to provide cleaning along substantially the entire height of the baffle 28. When the brush set 22, moving in the direction of action arrow D, engages a bracket 50, the brushes 40, 42 pivot (see action arrow E), stretching the springs 49, and the support arm 44 rises to the position shown in phantom in FIG. 4. Thus, the brushes 40, 42 step over the bracket 50 while also scrubbing algae therefrom. As the brushes 40, 42 move past the bracket 50, the springs 49 bias the brushes back into a substantially vertical orientation and the weight of the brushes causes the arm 44 to again drop to the full line position. In this position the brushes 40, 42 again serve to clean down along the baffle 28 between the brackets 50 (see also FIG. 4A). Thus, the baffle 28 may be effectively cleaned without stopping each time a mounting bracket 50 is reached.

As also shown in FIG. 4A, the brushes 40, 42 may be positioned out of engagement with the baffle 28 and weir 30. More specifically, the arm 44 and brushes 40, 42 may be pivoted upwardly (see action arrow P) to the phantom line position. There, the arm 44 may be locked in position by a pin or other means not shown to allow the brushes 40, 42, for example, to be cleaned or changed.

As illustrated in FIGS. 1, 2 and 6, a second set of brushes 24 is provided to clean the outside surface of the weir 30 and the spillway 52. The second set of brushes 24 includes brush 54 to further clean the weir 30 and an upper substantially horizontal portion of the spillway 52. Brush 54 is pivotally attached to main frame member 14 through support arm 56 and bracket 58. During cleaning, support arm 56 and accordingly brush 54 are positively biased downwardly by spring 62 into scrubbing engagement with the spillway 52 and weir 30 to provide maximum cleaning.

As discussed above and shown in FIG. 6, brush 54 can be locked in the disengaged position by the use of a pin 60 installed in a second set of holes in bracket 58. This is shown by action arrow P and the phantom view.

The second set of brushes 24 also includes brush 64 to clean the sloping portion of spillway 52. Brush 64 is pivotally mounted to main frame member 14 via support arm 66 and pivot pin 68. Spring 70 is provided to securely bias brush 64 against the surface of spillway 52. Handle 72 may be manipulated by the operator to pivot brush 64 out of operative engagement with spillway 54. As shown in FIG. 6, handle 72 works through chain 73 to move brush 64 (see also action arrow P). Handle 72 is then locked into the non-operative position by locking means (not shown). To return brush 64 to the operative position, handle 72 is released, and spring 70 pulls brush 64 back into the operative position.

As is shown in FIGS. 2 and 7, the third set of brushes 26 is provided to clean the sides and bottom of the launder or clean water flow channel 74.

Brush set 26 is comprised of three individual brushes 76, 78 and 80. The three brushes 76, 78 and 80 are mounted to a common base member 82. Advantageously, this results in a one piece brush set which can be connected to main frame member 14 by a single support arm 84. A mounting bracket (not shown) is provided to allow pivotal motion between main frame member 14 and the support arm 84. Of course, the third set of brushes 26 may assume an alternative configuration if desired. In one possible alternative embodiment the third brush set 36 comprises a pair of cooperating support arms and brush assemblies that are biased away from each other toward the inner and outer sidewalls of the launder 74.

Brushes 76 and 78 are mounted to base member 82 by one or more spring loaded telescoping tubes 86. Advantageously, the spring loaded telescoping tubes 86 bias. brushes 76 and 78 apart from one another into tight scrubbing engagement with the walls of launder 74. A keeper 88 is provided to limit the expansion of the telescoping tubes 86. In the preferred embodiment, keeper 88 is simply a threaded rod attached to brush 76. The rod freely passes through base member 82 and is retained against the spring force by a nut threaded on the opposite side of base member 82. By adjusting keeper 88, the width of brush set 26 can easily be adapted to conform to a wide variety of launders as found in different water treatment tanks.

The remaining brush in set 26, brush 80 is attached to base member 82 and firmly forced into engagement with the bottom of launder 74 simply by the combined weight of the brush set. Due to an observed tendency of brush set 26 to twist during operation, stabilizer bar 89 is provided between support arm 84 and base member 82 to counteract any rotative tendencies. This assures full brush contact with the side and bottom walls of the channel and, therefore, maximum cleaning.

Figure 3:
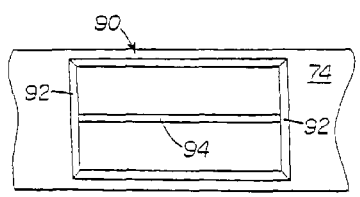
FIG. 3 is a plan view of the bridging device used in the present invention shown installed in the bottom of the clean water flow channel.

As shown in FIG. 3, a water outlet bridge 90 is provided in the bottom of launder 74. The bridge 90 covers the clean water outlet in the launder 74. More specifically, bridge 90 is provided to physically prevent brush set 26 from falling into the clean water outlet during operation. In the preferred embodiment, bridge 90 is fabricated of angle iron 92 with one or more brush supporting cross bars 94. Installation of bridge 90 is quite simple and is accomplished merely by placement over the outlet with the angle irons 92 engaging opposing lips of the outlet. The force of the clean water flow rushing into the outlet keeps the bridge 90 in place. One bridge 90 can be positioned in each tank of a water treatment facility and simply left in position since it does not significantly affect water flow. Conversely, if desired one bridge 90 can be moved from tank to tank with the remainder of the apparatus 10. Because no fasteners are required to hold the bridge 90 in position, such movement can be simply and quickly completed.

It should be appreciated that hoses, ladders and other equipment may be inadvertently left by an employee in the launder 74 or along the spillway 52, weir 30 or baffle 28 after performing some service or other function. When this occurs and the motor driving the skimmer blade 16 is restarted, the possibility exists that one of the brushes of brush sets 22, 24 and 26 or even one of the brush support arms 34, 44, 56 and 66 may engage and become entangled with the impediment. Potential damage to the apparatus 10 and the skimmer blade 16 is prevented since each scrubber assembly or brush set 22, 24 and 26 is made to break away.

Figure 8:
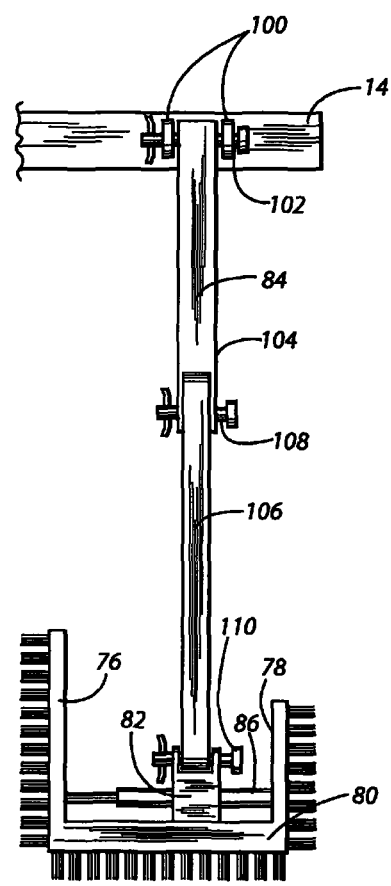
FIG. 8 is a schematical view illustrating several possible embodiments of the invention.

More specifically, reference is now made to FIG. 8 which schematically illustrates the breakaway assembly for the brush set 26. While only brush set 26 is illustrated, it should be appreciated that the concepts illustrated and described are equally applicable to the other brush sets 22, 24 and support arms 34, 44, 56 and 66 of the assembly 10. As illustrated, the frame member 14 includes a clevis 100. The end of the support arm 84 is secured to the clevis 100 on the frame member 14 by a pin 102. The illustrated support arm 84 includes two sections 104, 106 that are secured together by the pin 108. Additionally, the base member 82 that holds the brushes 76, 78, 80 is secured to the end of the support arm 84 by the pin 110.

In accordance with the teachings of the present invention, one, two or all three of the pins 102, 108, 110 are shear pins. Each shear pin 102, 108 and/or 110 is designed to break when subjected to a force exceeding a predetermined value. In another possible embodiment, the set bolts 20 used to secure the frame member 14 to the skimmer blade 16 are shear bolts designed to break when subjected to a predetermined force having a value A where A is less than a force B sufficient to damage the mechanically driven skimmer arm, but greater than the force C needed to drive the brush set 26 around the water treatment tank 12 and perform the desired cleaning operation. Typically, the value A is between about 711 to about 1068 Newtons and more typically between about 800 to about 980 Newtons.

If and when the brush set 26 hangs up on a baffle bracket, bolt, splice plate, scumbox support, flushing device or the like or engages an impediment, such as a ladder, left in the launder 74, one or more of the shear pins or bolts 20, 102, 108 and/or 110 will break at a designed weak point. This functions to release the brush set 26 from connection with the skimmer blade 16 before a force sufficient to damage the skimmer blade 16 or the skimmer blade drive motor is developed by the engagement of the brush set with the impediment. Thus, potential costly damage is avoided.

Figure 9:
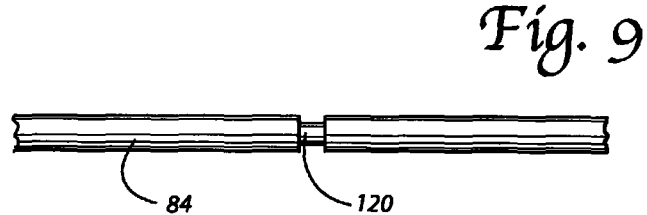
FIG. 9 is a schematical view of yet another possible embodiment of the present invention.

In accordance with yet another alternative embodiment disclosed in FIG. 9, the support arm 84 is a single piece having a frangible line or weak point 120 designed to break when the arm is subjected to a force exceeding a predetermined value. That predetermined value is identical or similar to the value selected for the failure of the shear pins and bolts 20, 102, 108 and/or 110 as previously described. The idea is for the support arm 84 to break at the frangible point 120 before any damage can be done to the skimmer blade 16 or the skimmer blade drive motor when the brush set 26 has engaged an impediment. Of course, the predetermined value of the break point must be high enough to allow the brush set 26 to clean the launder 74 under normal operating conditions without breaking free.

In accordance with yet another embodiment of the present invention, the main frame member 14 of the apparatus 10 may be made to break away in the event of a hang-up (see FIG. 2). This may be accomplished in at least three ways. In accordance with one possible embodiment, the set bolts 20 that fasten the apparatus 10 to the skimmer blade 16 are replaced with shear bolts or pins of appropriate strength. In another possible embodiment, the mounting bracket 18 includes a frangible section 18' of appropriate strength that will break in the event of a hang-up. In still another embodiment, the main frame member 14 includes a frangible section 14' that will break in the event of a hang-up. Of course, the shear bolts/pins 20, frangible section 18' and/or frangible section 14' will not break under normal operating conditions.

In summary, numerous benefits are achieved by the use of the apparatus 10 of the present invention. More specifically, the apparatus 10 is adapted to be quickly and easily installed on an existing skimmer blade 16 of a water treatment tank 12. Once the brush sets 22, 24 and/or 26 of the apparatus 10 are installed and placed into engaged or operative positions, the apparatus 10 cleans the tank automatically. This results in significant savings in time and labor expended. Further, the apparatus 10 includes breakaway scrubbing assemblies or brush sets 22, 24 and 26 that function to prevent damage to both the apparatus 10 and the mechanically driven skimmer blade 16 of the treatment tank in the unfortunate event of the apparatus 10 engaging and becoming entangled with an impediment of any type.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, the brush sets can be replaced by sponges, pads, squeegees, wipers and even high pressure water jets to provide the cleaning action.

The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally and equitably entitled. The drawings and preferred embodiments do not and are not intended to limit the ordinary meaning of the claims and their fair and broad interpretation in any way.

The invention claimed is:

1. An apparatus for cleaning algae and other debris from a water treatment tank including a mechanically driven component, comprising:

a breakaway water treatment tank scrubber assembly including a support arm and a cleaning tool mounted on said support arm, said support arm includes a first section and a second section; and a mounting bracket securing said breakaway water treatment tank scrubber assembly to said mechanically driven component;

said breakaway water treatment tank scrubber assembly further including a first fastener securing said support arm to said mounting bracket, a second fastener securing said support arm to said cleaning tool and a third fastener securing said first section and said second section of said support arm together wherein at least one of said first, second and third fasteners is a shear pin or shear bolt designed to break when subjected to a force exceeding a predetermined value.

2. The apparatus of claim 1, wherein said first fastener is the shear pin or shear bolt.

3. The apparatus of claim 1, wherein said second fastener is the shear pin or shear bolt.

4. The apparatus of claim 1, wherein said third fastener is the shear pin or shear bolt designed to break when subjected to a force exceeding a predetermined value.

5. The apparatus of claim 1, wherein said cleaning tool is selected from a group consisting of a brush, a sponge, a pad, a squeegee, a wiper, a high pressure water jet or a combination thereof.

6. An apparatus for cleaning algae and other debris from a water treatment tank including a mechanically driven component and a baffle, comprising:

a breakaway baffle scrubber assembly including a support arm having a first section, a second section, and a fastener securing said first section and said second section of said support arm together, said breakaway baffle scrubber assembly incorporating a shear pin or shear bolt designed to break when subjected to a force exceeding a predetermined value; and a mounting bracket securing said breakaway baffle scrubber assembly to said mechanically driven component.

7. An apparatus for cleaning algae and other debris from a water treatment tank including a mechanically driven component and a weir, comprising:

a breakaway weir scrubber assembly including a support arm having a first section, a second section, and a fastener securing said first section and said second section of said support arm together, said breakaway baffle scrubber assembly incorporating a shear pin or shear bolt designed to break when subjected to a force exceeding a predetermined value; and a mounting bracket securing said breakaway weir scrubber assembly to said mechanically driven component.

8. An apparatus for cleaning algae and other debris from a water treatment tank including a mechanically driven component and a launder, comprising:

a breakaway launder scrubber assembly including a support arm having a first section, a second section, and a fastener securing said first section and said second section of said support arm together, said breakaway baffle scrubber assembly incorporating a shear pin or shear bolt designed to break when subjected to a force exceeding a predetermined value; and a mounting bracket securing said breakaway launder scrubber assembly to said mechanically driven component.

9. An apparatus for cleaning algae and other debris from a water treatment tank including a mechanically driven component and a spillway, comprising:
- a breakaway spillway scrubber assembly including a support arm having a first section, a second section, and a fastener securing said first section and said second section of said support arm together, said breakaway baffle scrubber assembly incorporating a shear pin or shear bolt designed to break when subjected to a force exceeding a predetermined value; and
- a mounting bracket securing said breakaway spillway scrubber assembly to said mechanically driven component.

10. A method of preventing potential damage to a mechanically driven component in a water treatment tank, comprising:
- cleaning a surface of said water treatment tank with a scrubber attached to said mechanically driven component; and
- securing said scrubber to said mechanically driven component by breakaway shear pin connection designed to break when subjected to a force exceeding a predetermined value A where A is less than a force B sufficient to damage said mechanically driven component and greater than a force C sufficient to drive said scrubber around said water treatment tank and perform the desired cleaning operation.

11. The method of claim 10 including selecting a value A of between about 711 to about 1068 Newtons.

12. The method of claim 10 including selecting a value A of between about 800 to about 980 Newtons.

13. An apparatus for cleaning algae and other debris from a water treatment tank including a mechanically driven component, comprising:
- a breakaway frame including a frangible section;
- a mounting bracket connecting said breakaway frame to said mechanically driven component, said mounting bracket including a frangible section;
- a water treatment tank scrubber assembly secured to said breakaway frame; and
- a fastener securing said breakaway frame to the mechanically driven component, said fastener comprising a shear pin or shear bolt.

* * * * *